April 22, 1930.    C. E. MICHAUD ET AL    1,755,999
TIRE RIM MOUNTING MEANS
Filed July 26, 1926

Inventors.
C. E. Michaud and
L. Lapierre
By Caron & Caron
Attorneys

Patented Apr. 22, 1930

1,755,999

UNITED STATES PATENT OFFICE

CHARLES E. MICHAUD AND LUCIEN LAPIERRE, OF HULL, QUEBEC, CANADA

TIRE-RIM-MOUNTING MEANS

Application filed July 26, 1926. Serial No. 124,920.

Our invention relates to tire rim mounting means, and more particularly to a means of mounting and holding the rim to an automobile wheel or other such vehicle wheel; the main object being to provide a rim which is quickly detachable from the wheel; a second object being to dispense with the large number of bolts usually provided to hold such rims on the wheel and limit this to one bolt only; a further object being to provide a rim of simplified construction, light in weight and consisting of a minimum number of parts.

Our invention will be more clearly understood by following the description to which drawings are appended, in which—

Similar characters of reference refer to similar parts throughout the different figures.

Figure 1:
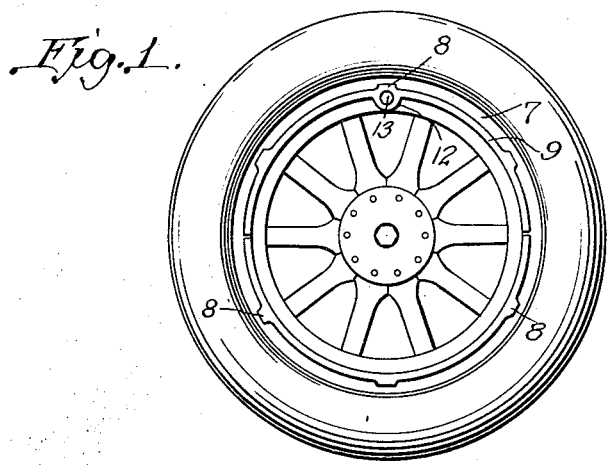
Figure 1 shows a wheel complete with rim and tire, mounted as per our invention.
Figure 2:
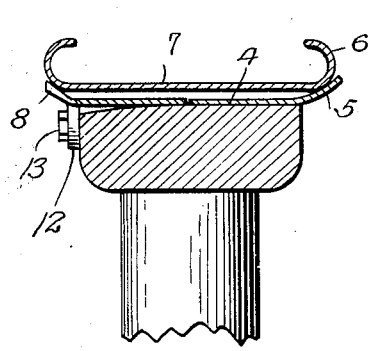
Figure 2 is a cross section of the rim, its supporting means, and the felloe of the wheel.
Figure 3:
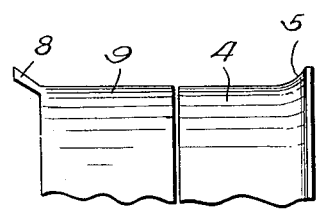
Figure 3 shows a portion of the supporting ring and the manner in which its respective parts are held together.
Figure 3:
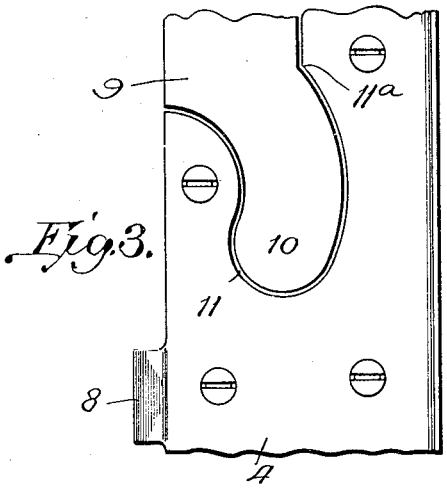

Referring to Figure 3, 4 is a ring intended to be mounted around the felloe of the wheel or to be built in as a part of the felloe itself, or again to be integral with a pressed disc wheel, or again to be mounted on a wire wheel. This ring has a curved edge 5 in order to rest against the inner edge 6 of the tire rim 7, as shown in Figure 2. The tire rim is supported at its outer edge by means of lugs 8 placed at an angle to the plane of the face of the ring, as shown in Figure 2.

In order to permit the removal and replacing of the tire rim, the ring 4 has a detachable portion 9 forming one quarter of the rim itself. This portion is semi-circular and of one-half the width of the ring 4. This portion 9 has at each end thereof a finger 10 which will engage in a corresponding curved slot 11 in the ring 4, holding the same hingingly and has midway thereon an integral lug 12 perforated to receive a bolt 13 to hold the two portions of the ring together by bolting the same to the felloe, as shown in Figure 2. It will be seen that the lug 10 when engaged in slot 11 will lock the portion 9 to the ring 4 against any upward movement due to the contact of the finger 10 on the ring 4 at 11ª.

In operation, when it is desired to mount a tire on the wheel, the bolt 13 is withdrawn and by clasping the portion 9 midway between the fingers 10 and pulling the same outwardly, it will cause the said fingers to travel over the curved portion 11 of the rim until sufficient clearance is obtained to insert the tire rim 4 in the ordinary manner. The portion 9 will then be placed in position and tightened. This will bring the lugs 8 on the portion 9 and the curved portion 5 of the ring 4 closer together when their outward inclination will tend to bind the tire rim 7 and hold the same firmly in a central position. For removing the tire, the operation is reversed.

Although we have shown our invention consisting of a means for mounting a tire rim consisting of a separate ring mounted on the felloe of a wheel, it must be understood that, as previously mentioned in the description, this ring may be either part of the wheel itself or the wheel may be constructed so as to present to the tire rim an arrangement which will work similarly to that described, falling within the scope of this invention and within the scope of the following claims.

We claim:

1. Means for mounting a demountable tire rim to a wheel, comprising a felly band rigidly fastened to the felly, a bodily removable portion on said felly band, consisting of a removable circular strip portion of half the width of the felly band, fingers at both ends of said strip portion, cutaway portions corresponding to the fingers in said felly band to allow the fingers to rest therein, and means comprising a lug integral with said strip portion depending therefrom and positioned to receive a bolt fastened to the felly.

2. Means for mounting a demountable tire rim to a wheel, comprising a felly band having an inwardly continuous edge turned upwardly and lugs extending upwardly on the opposite edge thereof, a bodily removable circular strip portion of half the width of the felly band, curved fingers at both ends of said strip portion, cutaway portions corresponding to the fingers in said felly band to allow the fingers to rest therein, and means comprising a lug integral with said strip portion depending therefrom and positioned to receive a bolt fastened to the felly.

In testimony of the foregoing, we have hereto affixed our signatures, August, A. D. 1925.

C. E. MICHAUD.
LUCIEN LAPIERRE.